(12) United States Patent
Hong et al.

(10) Patent No.: US 12,417,017 B2
(45) Date of Patent: Sep. 16, 2025

(54) ELECTRONIC DEVICE AND METHOD WITH COMPRESSED STORAGE FORMAT CONVERSION

(71) Applicant: SAMSUNG ELECTRONICS CO., LTD., Suwon-si (KR)

(72) Inventors: Hyesun Hong, Suwon-si (KR); Jinpil Lee, Suwon-si (KR); Dongjin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 18/524,358

(22) Filed: Nov. 30, 2023

(65) Prior Publication Data
US 2024/0184448 A1 Jun. 6, 2024

(30) Foreign Application Priority Data
Dec. 1, 2022 (KR) .......................... 10-2022-0165758

(51) Int. Cl.
*G06F 3/06* (2006.01)
(52) U.S. Cl.
CPC .......... *G06F 3/0608* (2013.01); *G06F 3/0655* (2013.01); *G06F 3/0673* (2013.01)
(58) Field of Classification Search
CPC .... G06F 3/0608; G06F 3/0655; G06F 3/0673; G06F 17/16; H03M 7/30; G06N 20/00
See application file for complete search history.

(56) References Cited

U.S. PATENT DOCUMENTS

| 11,012,089 | B1 | 5/2021 | Boyd | |
|---|---|---|---|---|
| 2011/0078226 | A1* | 3/2011 | Baskaran | ................ G06F 17/16 708/607 |
| 2020/0356292 | A1* | 11/2020 | Ippatapu | ............ G06F 11/1453 |
| 2020/0363972 | A1* | 11/2020 | Krasner | ................ G06F 3/0641 |
| 2022/0236904 | A1* | 7/2022 | Miller | ................... G06F 3/0673 |

FOREIGN PATENT DOCUMENTS

| CN | 114329329 A | * | 4/2022 | ......... G06F 15/8046 |
|---|---|---|---|---|
| KR | 10-2041744 B1 | | 11/2019 | |
| KR | 10-2021-0090691 A | | 7/2021 | |
| KR | 10-2292449 B1 | | 8/2021 | |

OTHER PUBLICATIONS

CN114329329A Translation (Year: 2022).*

(Continued)

*Primary Examiner* — Zhuo H Li
(74) *Attorney, Agent, or Firm* — NSIP Law

(57) ABSTRACT

An electronic device includes a host processor configured to: convert a sparse matrix compressed and expressed in a first compressed format into a second compressed storage format, based on a feature of the sparse matrix; preprocess a vector based on the second compressed storage format; and transmit the sparse matrix converted into the second compressed storage format and the preprocessed vector to a computing device; and the computing device configured to multiply the sparse matrix converted into the second compressed storage format by the preprocessed vector.

20 Claims, 14 Drawing Sheets

(56) References Cited

OTHER PUBLICATIONS

Xie, Xinfeng, et al., "SpaceA: Sparse Matrix Vector Multiplication on Processing-in-Memory Accelerator," 2021 IEEE International Symposium on High-Performance Computer Architecture (HPCA), 2021, (14 Pages in English).

Giannoula, Christina, et al., "SparseP: Towards Efficient Sparse Matrix Vector Multiplication on Real Processing-In-Memory Architectures," Proceedings of the ACM on Measurement and Analysis of Computing Systems vol. 6, No. 1, Mar. 2022, (49 Pages in English).

Ahmed, Muhammad, et al., "AAQAL: A Machine Learning-Based Tool for Performance Optimization of Parallel SPMV Computations Using Block CSR," Applied Sciences, Jul. 13, 2022, (26 Pages in English).

\* cited by examiner

FIG. 14

ELECTRONIC DEVICE AND METHOD WITH COMPRESSED STORAGE FORMAT CONVERSION

CROSS-REFERENCE TO RELATED APPLICATIONS

This application claims the benefit under 35 USC § 119(a) of Korean Patent Application No. 10-2022-0165758, filed on Dec. 1, 2022, in the Korean Intellectual Property Office, the entire disclosure of which is incorporated herein by reference for all purposes.

BACKGROUND

1. Field

The following description relates to an electronic device and method with compressed storage format conversion.

2. Description of Related Art

A sparse matrix may be a matrix in which most of the matrix values are 0. The sparse matrix may be used to solve problems in science, engineering, modeling, and other fields. In addition, the sparse matrix may be used in high-performance computing (HPC) having a large throughput. For example, the sparse matrix may be used for an operation between sparse matrices, an operation between a sparse matrix and a vector, an operation between a sparse matrix and a sparse vector, and other operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an electronic device includes: a host processor configured to: convert a sparse matrix compressed and expressed in a first compressed format into a second compressed storage format, based on a feature of the sparse matrix; preprocess a vector based on the second compressed storage format; and transmit the sparse matrix converted into the second compressed storage format and the preprocessed vector to a computing device; and the computing device configured to multiply the sparse matrix converted into the second compressed storage format by the preprocessed vector.

For the converting of the sparse matrix into the second compressed storage format, the host processor may be configured to: extract a feature from the sparse matrix; output candidate compressed storage formats by inputting the feature to a machine learning model; and determine the second compressed storage format among the candidate compressed storage formats.

The feature may include a sparsity rate referring to a rate of 0 values comprised by the sparse matrix and a sparsity pattern referring to a pattern of the 0 values comprised by the sparse matrix.

For the converting of the sparse matrix into the second compressed storage format, the host processor may be configured to convert the first compressed storage format of the sparse matrix into the second compressed storage format in response to the second compressed storage format being different from the first compressed storage format of the sparse matrix.

For the determining of the second compressed storage format, the host processor may be configured to determine one of the candidate compressed storage formats to be the second compressed storage format, based on a number of cycles that is a number of operations performed by the computing device in multiplying the sparse matrix converted into a candidate compressed storage format by the vector.

For the preprocessing of the vector, the host processor may be configured to extract and align elements of the vector to be used for the multiplication based on the second compressed storage format.

For the converting of the sparse matrix into the second compressed storage format, the host processor may be configured to: divide the sparse matrix into a plurality of blocks; and convert the sparse matrix compressed and expressed in the first compressed storage format into the second compressed storage format by converting a compressed storage format of the plurality of blocks.

For the converting the sparse matrix into the second compressed storage format, the host processor may be configured to: extract a feature of the sparse matrix; output a candidate compressed storage format for each of the plurality of blocks by inputting the feature to a machine learning model; and determine the second compressed storage format among a plurality of combinations of the candidate compressed storage formats of the plurality of blocks.

The feature may include a sparsity rate referring to a rate of 0 values comprised by the sparse matrix and a sparsity pattern referring to a pattern of the 0 values comprised by the sparse matrix.

The host processor may be configured to: determine the number of cycles that is a number of operations performed by the computing device in multiplying a block in a candidate compressed storage format comprised in the plurality of combinations by the vector; and determine one of the plurality of combinations to be the second compressed storage format based on the number of the cycles.

For the preprocessing of the vector, the host processor may be configured to extract and align elements of the vector to be used for the multiplication for each of the plurality of blocks, based on a converted compressed storage format of the plurality of blocks comprised in the sparse matrix converted into the second compressed storage format.

In one or more general aspects, a processor-implemented method includes: converting a sparse matrix compressed and expressed in a first compressed storage format into a second compressed storage format, based on a feature of the sparse matrix; preprocessing a vector based on the second compressed storage format; and transmitting the sparse matrix converted into the second compressed storage format and the preprocessed vector to a computing device,
  wherein the computing device is configured to multiply the sparse matrix converted into the second compressed storage format by the preprocessed vector.

The converting of the sparse matrix into the second compressed storage format may include: extracting a feature from the sparse matrix; outputting candidate compressed storage formats by inputting the feature to a machine learning model; and determining the second compressed storage format among the candidate compressed storage formats.

The feature may include a sparsity rate referring to a rate of 0 values comprised by the sparse matrix and a sparsity pattern referring to a pattern of the 0 values comprised by the sparse matrix.

The converting of the sparse matrix into the second compressed storage format further may include converting the first compressed storage format of the sparse matrix into the second compressed storage format in response to the second compressed storage format being different from the first compressed storage format of the sparse matrix.

The determining of the second compressed storage format may include determining one of the candidate compressed storage formats to be the second compressed storage format, based on a number of cycles that is a number of operations performed by the computing device in multiplying the sparse matrix converted into a candidate compressed storage format with the vector.

The preprocessing the vector may include extracting and arranging elements of the vector to be used for the multiplication based on the second compressed storage format.

The converting of the sparse matrix into the second compressed storage format further may include: dividing the sparse matrix into a plurality of blocks; and converting the sparse matrix compressed and expressed in the first compressed storage format into the second compressed storage format by converting a compressed storage format of the plurality of blocks.

The converting the sparse matrix into the second compressed storage format further may include: extracting a feature of the sparse matrix; outputting a candidate compressed storage format for each of the plurality of blocks by inputting the feature to a machine learning model; and determining the second compressed storage format among a plurality of combinations of the candidate compressed storage formats of the plurality of blocks, wherein the feature may include a sparsity rate referring to a rate of 0 values comprised by the sparse matrix and a sparsity pattern referring to a pattern of the 0 values comprised by the sparse matrix.

The determining the second compressed storage format further may include: determining the number of cycles that is a number of operations performed by the computing device in multiplying a block in a candidate compressed storage format comprised in the plurality of combinations by the vector; and determining one of the plurality of combinations to be the second compressed storage format based on the number of the cycles.

Other features and aspects will be apparent from the following detailed description, the drawings, and the claims.

BRIEF DESCRIPTION OF THE DRAWINGS

FIG. 14 illustrates an example of a preprocessing of a vector.

Figure 1:
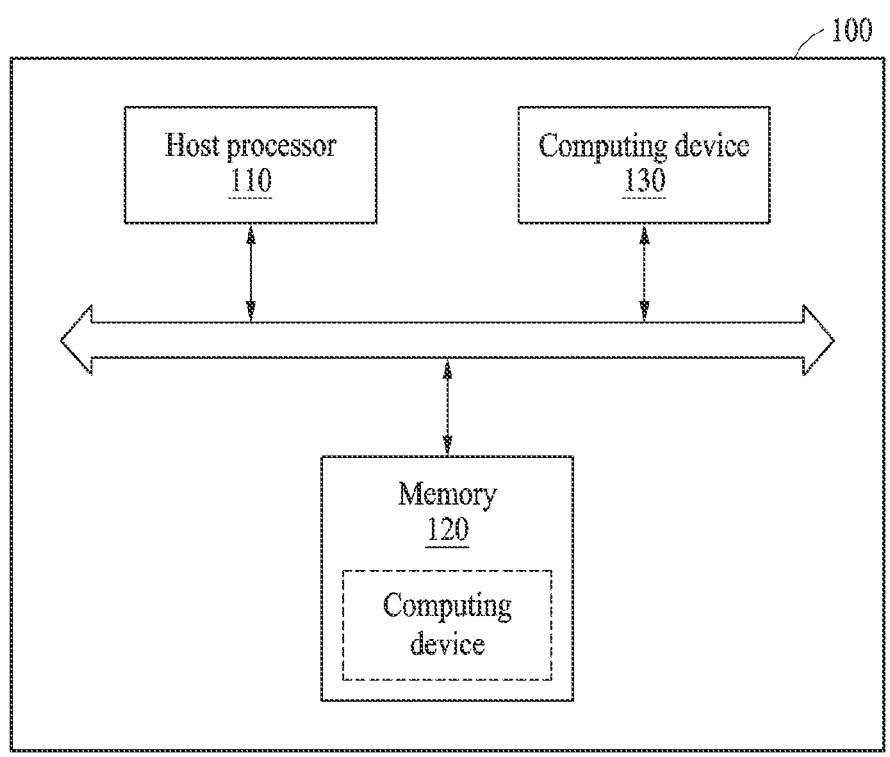
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an electronic device.

Referring to FIG. 1, an electronic device 100 may include a host processor 110 (e.g., one or more processors), a memory 120 (e.g., one or more memories), and a computing device 130. The host processor 110, the memory 120, and the computing device 130 may communicate with one another through a bus, a network on a chip (NoC), a peripheral component interconnect express (PCIe), and the like. In the example of FIG. 1, only the components related to the example described herein are illustrated as being included in the electronic device 100. Thus, the electronic device 100 may also include other general-purpose components in addition to the components illustrated in FIG. 1.

The host processor 110 may perform overall functions for controlling the electronic device 100. The host processor 110 may control the electronic device 100 overall by executing programs and/or instructions stored in the memory 120 and/or the computing device 130. For example, the memory 120 may be or include a non-transitory computer-readable storage medium storing instructions that, when executed by the host processor 110, configure the host processor 110 to perform any one, any combination, or all of operations and methods of the host processor 110 disclosed herein. The host processor 110 may be implemented in a central processing unit (CPU), a graphics processing unit (GPU), a neural processing unit (NPU), a tensor processing unit (TPU), and a field-programmable gate array (FPGA) that are included in the electronic device 100, but the examples are not limited thereto.

The memory 120 may be hardware for storing data processed in the electronic device 100 and data to be processed. In addition, the memory 120 may store an application, a driver, and the like to be driven by the electronic device 100. The memory 120 may include a volatile memory (e.g., dynamic random-access memory (DRAM)) and/or a nonvolatile memory. The memory 120 may include a computing device. In this case, the memory 120 may be processor-in-memory (PIM) or process-near-memory (PNM). The PIM and the PNM may be a computing device for performing an operation in a place where data is. The PIM and the PNM may support high parallelism and a wide memory bandwidth. The PIM and the PNM may decrease energy consumed for data movement by performing an operation in the place where data is.

The electronic device 100 may include the hardware computing device 130 for an operation. A separate dedicated processor, e.g., the computing device 130, may more efficiently process an operation, due to the characteristics of the operation, than a general-purpose processor, e.g., the host processor 110. In this case, one or more processing elements (PEs) included in the computing device 130 may be used. For example, the computing device 130 may be a system on chip (SoC), a NPU, a GPU, and the like.

Operations to be described below may be implemented by the host processor 110, but embodiments are not limited thereto.

A sparse matrix may be a matrix in which most of the matrix values are 0. To avoid the storage of 0, the sparse matrix may be stored in various compressed storage formats. The host processor 110 may convert a compressed storage format of the sparse matrix for multiplication with a vector.

According to an embodiment, the host processor 110 may receive the sparse matrix. The host processor 110 may optimize the received sparse matrix. The received sparse matrix may be a matrix compressed and expressed in a first compressed storage format. The host processor 110 may extract a feature of the sparse matrix and input the extracted feature to a machine learning model. The machine learning model may be a model trained to output a candidate compressed storage format which best expresses the sparse matrix with the feature of the sparse matrix as an input. There may be a plurality of candidate compressed storage formats. The host processor 110 may determine one of the candidate compressed storage formats to be a second compressed storage format, which is an optimized compressed storage format. When the first compressed storage format of the sparse matrix is different from the second compressed storage format of the sparse matrix, the host processor 110 may convert the compressed storage format of the sparse matrix to be the same compressed storage format.

The host processor 110 may preprocess the vector based on the second compressed storage format. The host processor 110 may input the sparse matrix converted into the second compressed storage format and the preprocessed vector to the computing device 130. The computing device 130 may multiply the sparse matrix converted into the second compressed storage format by the preprocessed vector. By optimizing the sparse matrix and preprocessing the vector, the electronic device 100 of one or more embodiments may minimize an operation of 0, and increase a memory bandwidth.

In addition, by the electronic device 100 of one or more embodiments optimizing the sparse matrix, the computing device 130 may efficiently perform multiplication with the vector.

Hereinafter, examples of the compressed storage format of the sparse matrix is described.

Figure 2:
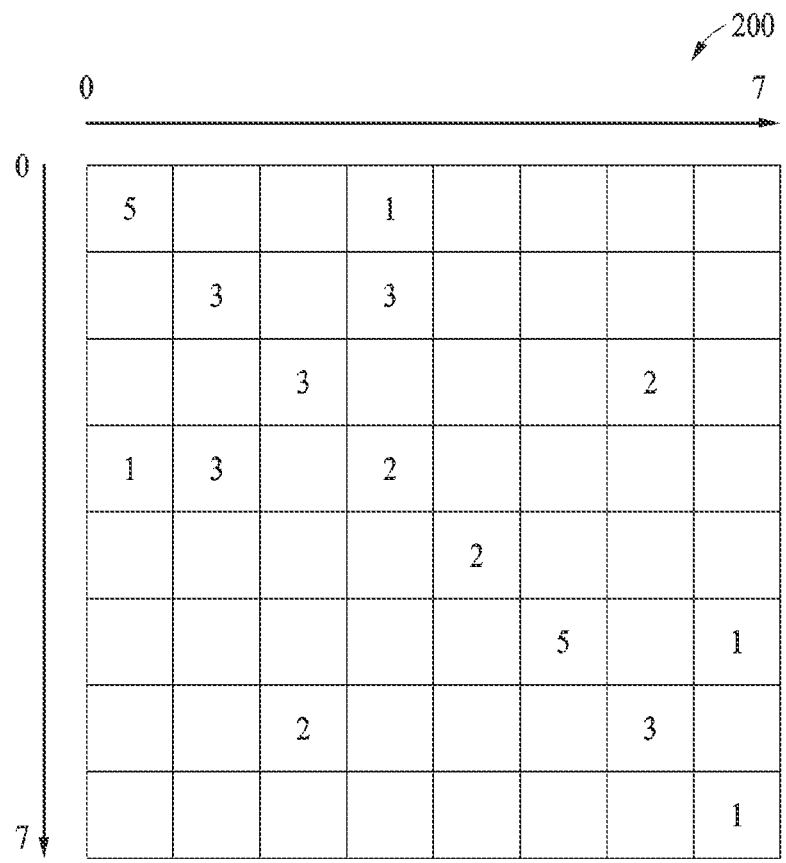
FIGS. 2 to 4 illustrate examples of a compressed storage format of a sparse matrix.
Figure 3:
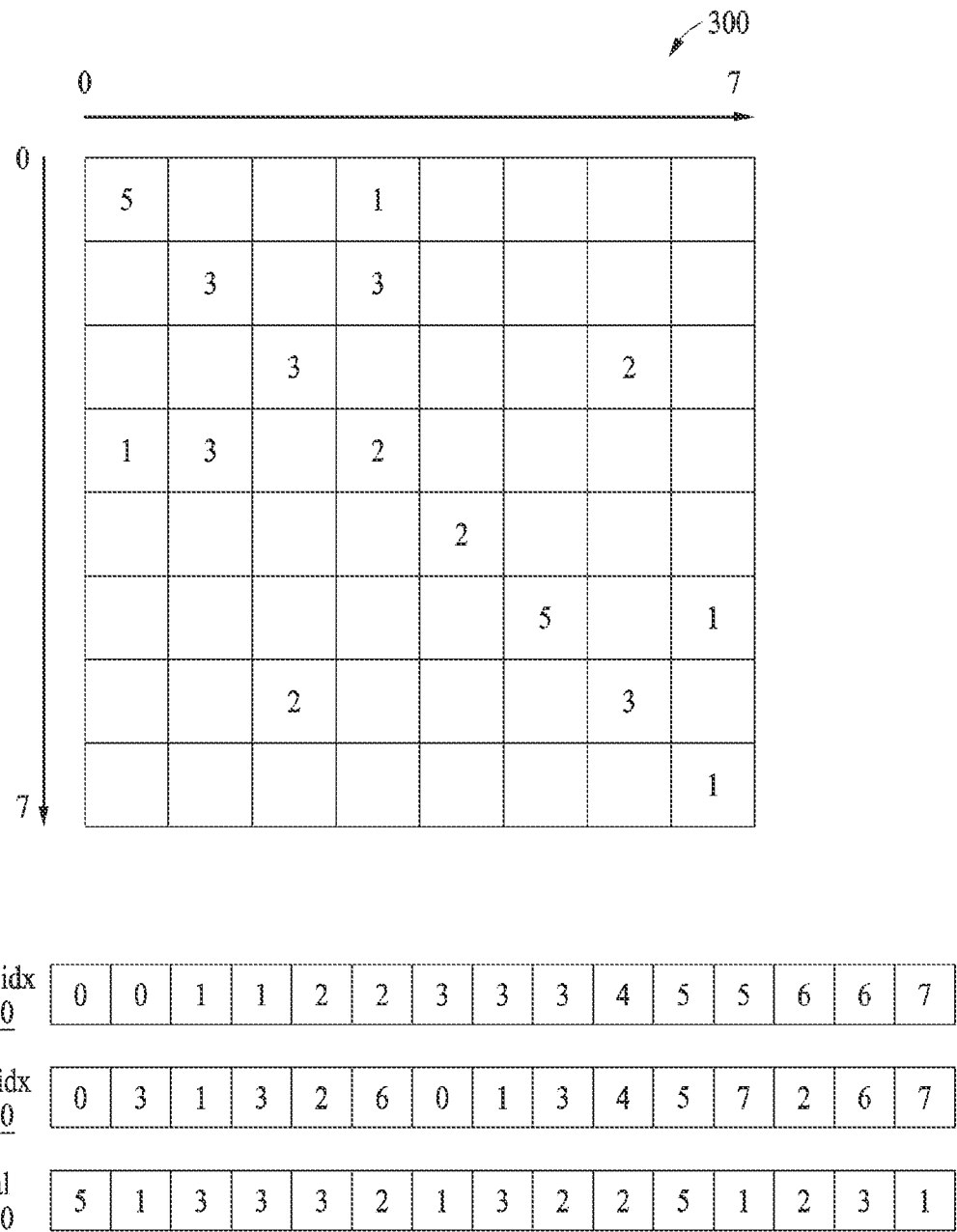
Figure 4:
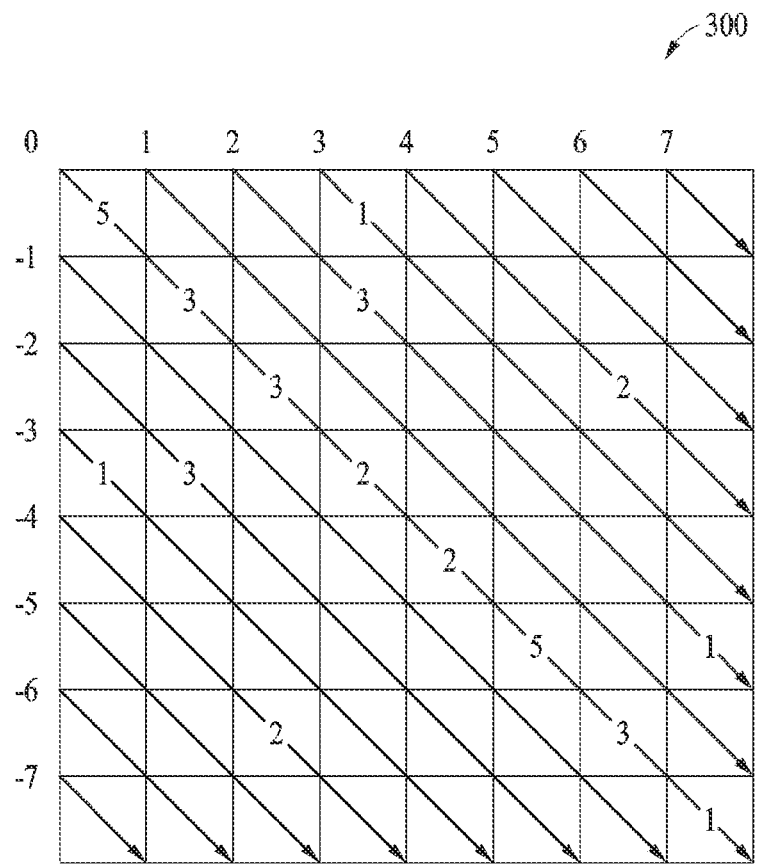

FIGS. 2 to 4 illustrate examples of a compressed storage format of a sparse matrix.

Referring to FIGS. 2 to 4, various compressed storage formats to avoid the storage of zero elements of the sparse matrix are illustrated.

FIG. 2 illustrates an example of storing a sparse matrix 200 in one of compressed storage formats, e.g., a compressed sparse row (CRS).

In a CSR format, a row pointer (e.g., a row ptr 210), a column index (e.g., a col idx 220), and a val 230 may be used to compress and express the sparse matrix 200.

A first factor of the row ptr 210, e.g., row ptr[0], may be a position of the first starting row (e.g., a position of the first non-zero value in the first starting row) of the sparse matrix 200. For example, when the sparse matrix 200 starts with 5 at (0,0), row ptr[0] may be 0. row ptr[1] may be the number of non-zero elements in the first starting row. row ptr[2] may be a cumulative sum, e.g., a sum of the number of non-zero elements in the second row and row ptr[1]. row ptr[3] may be a cumulative sum, e.g., a sum of the number of non-zero elements in the third row and row ptr[2].

Therefore, row ptr[n] may be the number of non-zero elements from the first starting row to the nth row. Accordingly, row ptr[8] may be the number of non-zero elements in the sparse matrix 200, which is 15. In other words, the number of non-zero elements in the sparse matrix 200 may be 15.

The col idx 220 may store a column position of non-zero elements in the sparse matrix 200. For example, the col idx[0] may be 0 when 5, which is the first element of the sparse matrix 200, is at (0,0). The col idx[1] may be 3 when 1, which is the second element of the sparse matrix 200, is at (0,3). The col idx[2] may be 1 when 3, which is the third element of the sparse matrix 200, is at (1,1).

Non-zero elements of the sparse matrix 200 in the CSR format may be stored in the val 230. The val 230 may store the non-zero elements starting from (0,0) to (7,7) in a row direction of the sparse matrix 200.

The CSR format may significantly save storage space because non-zero elements are compressed and expressed by using the row ptr 210, the col idx 220, and the val 230. In addition, the CSR format may decrease a memory bandwidth. When directly using the sparse matrix 200 expressed in the CSR format, an unnecessary operation may decrease. On the other hand, when the sparse matrix 200 does not include 0 and includes a row, the threads of a parallel processing unit, such as a GPU, may access the same data. Accordingly, a processor may not efficiently use the memory bandwidth.

There may be a compressed sparse column (CSC) that has a similar structure to the CSR format.

FIG. 3 illustrates an example of storing a sparse matrix 200 in one of compressed storage formats, e.g., a coordinate list (COO) format. The COO format may be a format that stores only a non-zero value, like the CSR format.

In the COO format, a row index (e.g., a row idx 310), a column index (e.g., a col idx 320), and a val 330 may be used to compress and express a sparse matrix 300.

The row idx 310 may store a row position of non-zero elements in the sparse matrix 300. For example, the row idx[0] may be 0 when 5, which is the first element of the sparse matrix 300, is at (0,0). The row idx[1] may be 3 when 1, which is the second element of the sparse matrix 300, is at (0,3). The row idx[2] may be 1 when 3, which is the third element of the sparse matrix 300, is at (1,1).

The col idx 320 may store a column position of non-zero elements in the sparse matrix 300 in the same method as the col idx 220 of FIG. 2. Accordingly, the description of the col idx 320 is omitted since the description thereof is the same as the description of the col idx 220.

The val 330 may store a non-zero element in the same method as the val 230 of FIG. 2. Accordingly, the description of the val 330 is omitted since the description thereof is the same as the description of the val 230 of FIG. 2.

The COO format may preserve the structure information of the sparse matrix 300 by storing a row index, unlike the CSR format. Accordingly, the COO format may have the flexibility to randomly change the order of the row idx 310 and the col idx 320. However, the COO format may store two or more elements all in the row idx 310 even though they are in the same row, and thus may require greater storage space than the CSR format.

FIG. 4 illustrates an example of storing a sparse matrix 400 in a diagonal (DIA) format, which is one of compressed storage formats. The DIA format may store an element in a diagonal unit.

The DIA format may use an offset 410 and a val 420 to compress and express the sparse matrix 400.

A diagonal line based on (0,0) may be defined as offset 0. For example, a diagonal line from (0,0) to (7,7) in the sparse matrix 400 may be defined as offset 0. A diagonal line in a cell below a matrix based on offset 0 may have a negative offset. A diagonal line in a cell above the matrix based on offset 0 may have a positive offset. For example, diagonal lines of 4, 3, and 2 cells below offset 0 in the sparse matrix 400 may include a non-zero element. Accordingly, the offset 410 may include −4, −3, and −2 elements. In addition, diagonal lines of 2, 3, and 4 cells above offset 0 in the sparse matrix 400 may include a non-zero element. Accordingly, the offset 410 may include 2, 3, and 4 elements.

The val 420 may store all elements included in a diagonal line including a non-zero element. For example, a diagonal line in 4 cells below offset 0 may include 2, which is a non-zero element, and thus, the val 420 may include "0 0 2 0" that are elements included in the diagonal line. For example, a diagonal line in 3 cells below offset 0 may include 1, which is a non-zero element, and thus, the val 420 may include "1 0 0 0 0" that are elements included in the diagonal line.

Accordingly, the DIA format may be advantageous when non-zero elements cluster in a diagonal direction. In this case, however, the offset 410 may be first identified to figure out the elements of a sparse matrix.

A compressed storage format may include all formats for compressing and expressing a sparse matrix, besides the CSR format, the COO format, and the DIA format that are described above. For example, the compressed storage format may include an ELL format, a block sparse row (BSR) format, a block compressed sparse row (BCSR) format, and a block coordinate list (BCOO) format.

As described above, storage space may decrease when using the compressed storage format for compressing and expressing a sparse matrix than when storing the sparse matrix itself.

Hereinafter, examples of the multiplication of a sparse matrix with a vector is described.

Figure 5:
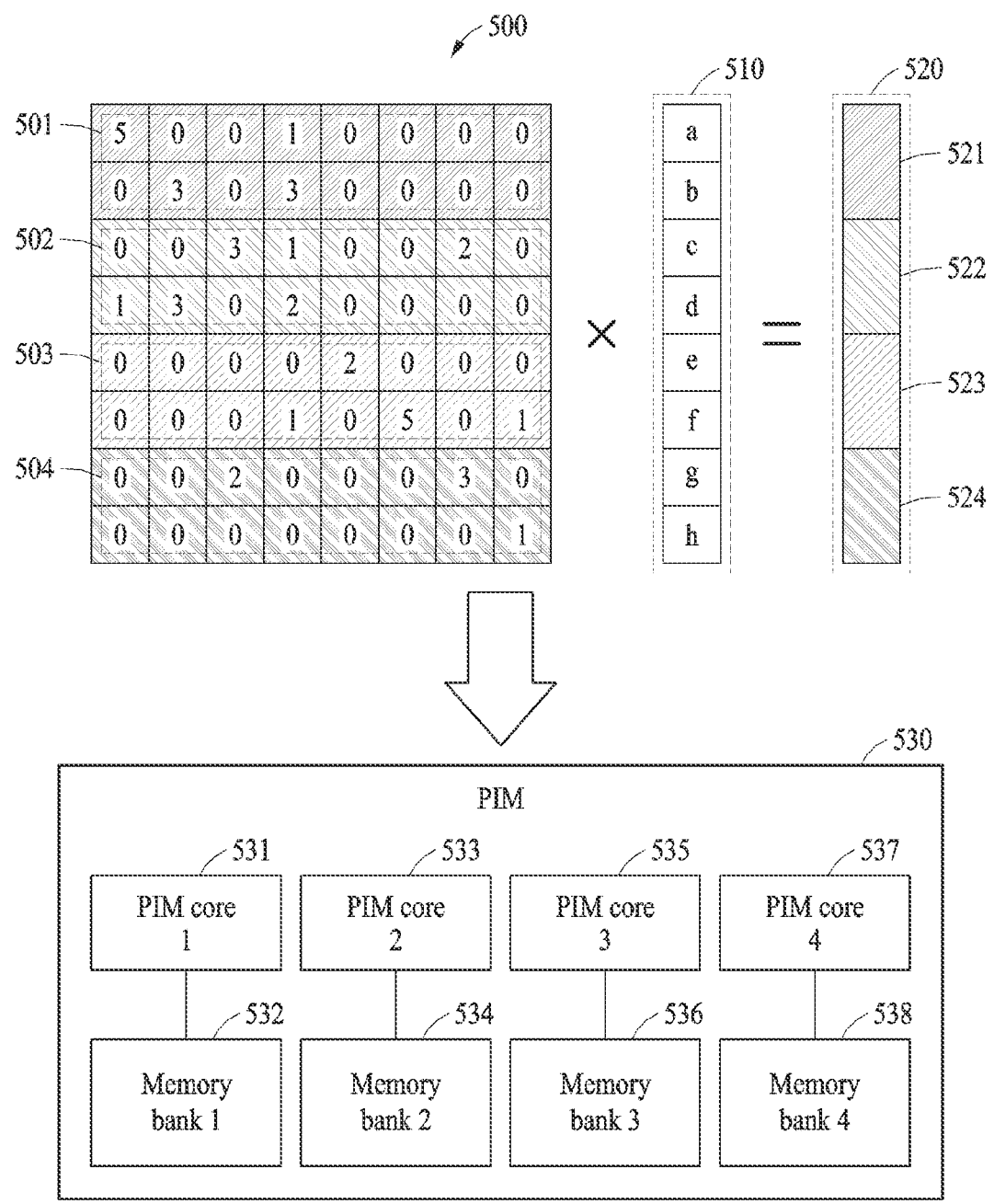
FIGS. 5 and 6 illustrate examples of a computing device for multiplying a sparse matrix by a vector.
Figure 6:
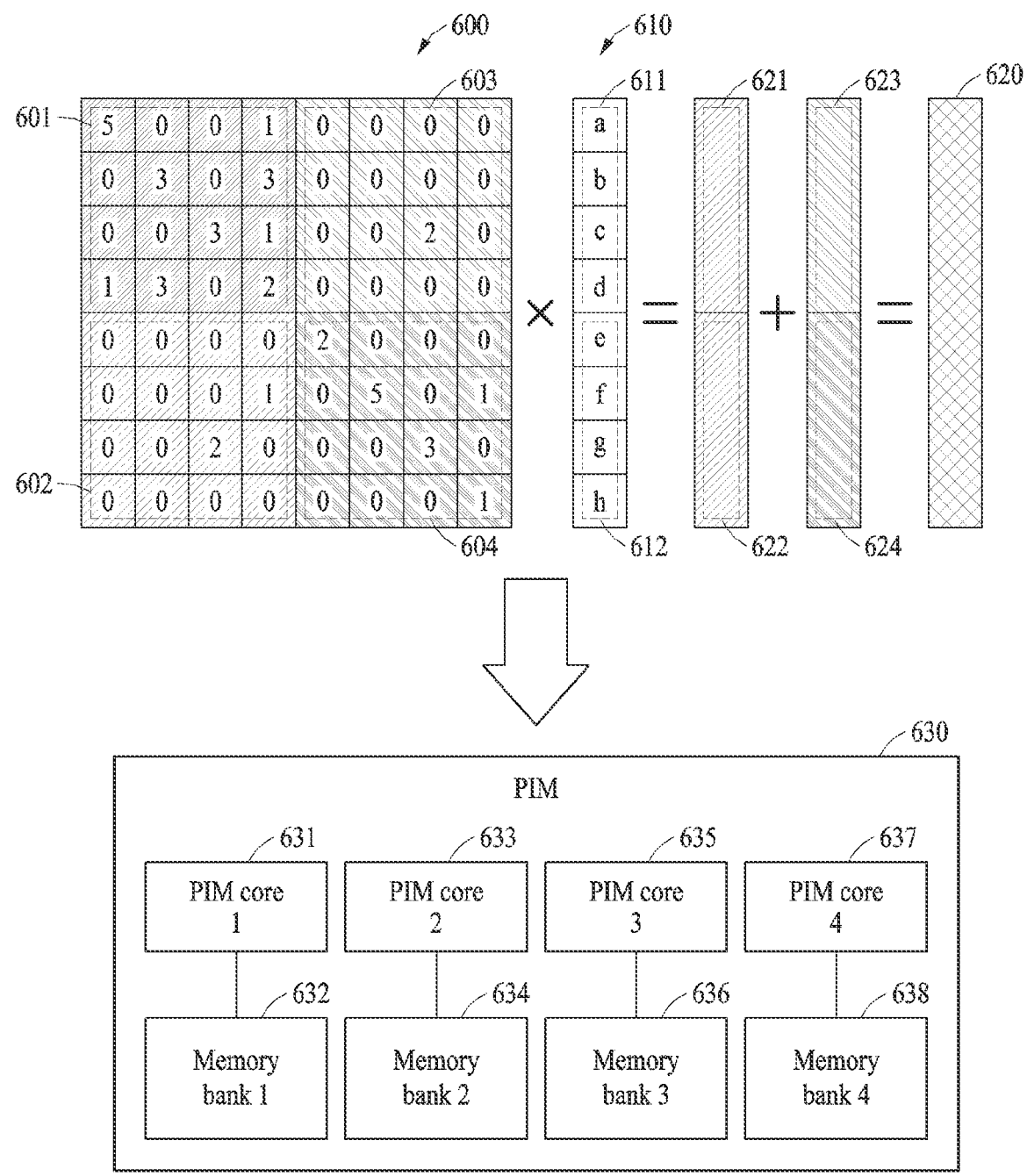

FIGS. 5 and 6 illustrate examples of a computing device for multiplying a sparse matrix by a vector.

FIG. 5 illustrates the computing device 130 for multiplying a sparse matrix 500 by a vector 510.

The computing device 130 for multiplying the sparse matrix 500 by the vector 510 includes various types as described above with reference to FIG. 1, the computing device 130 may be assumed to be PIM 530 for ease of description. The cores in the PIM 530 may only access data that is in their respective memory banks. For example, a PIM core 1 531 may only access data that is in a memory bank 1 532 connected thereto.

The sparse matrix 500 may be divided in a 1-dimensional (1D) row direction. The sparse matrix 500 may be divided into a first block 501, a second block 502, a third block 503, and a fourth block 504. The first block 501 to the fourth block 504 are divided in a row direction, and thus, all elements of the vector 510 may be used for multiplication.

Accordingly, a host processor may assign the first block 501 to the fourth block 504 to the PIM 530. For example, the host processor may assign the first block 501 and the vector 510 to the memory bank 1 532 connected to the PIM core 1 531. The host processor may assign the second block 502 and the vector 510 to a memory bank 2 534 connected to a PIM core 2 533. The host processor may assign the third block 503 and the vector 510 to a memory bank 3 536 connected to a PIM core 3 535. The host processor may assign the fourth block 504 and the vector 510 to a memory bank 4 538 connected to a PIM core 4 537.

The PIM core 1 531 may output a first result value 521 by multiplying the first block 501 by the vector 510. The PIM core 2 533 may output a second result value 522 by multiplying the second block 502 by the vector 510. The PIM core 3 535 may output a third result value 523 by multiplying the third block 503 by the vector 510. The PIM core 4 537 may output a fourth result value 524 by multiplying the fourth block 504 by the vector 510.

When the sparse matrix 500 is divided in the 1D row direction, the first result value 521 to the fourth result value 524 may be collected to output a final result value 520. In other words, by dividing the sparse matrix 500, the electronic device 100 of one or more embodiments may obtain the final result value 520 without performing a separate operation, thereby reducing an amount of computation.

Hereinafter, examples of a method of obtaining a total result value when dividing a matrix in a second dimension (2D) is described.

Referring to FIG. 6, a sparse matrix 600 may be divided in a row direction and a column direction. The description of PIM 630 of FIG. 6 is omitted since the PIM 630 is the same computing device as the PIM 530 of FIG. 5.

The sparse matrix 600 may be divided into a first block 601, a second block 602, a third block 603, and a fourth block 604. The first block 601 to the fourth block 604 are each divided in the row direction and the column direction, and thus, some (e.g., less than all) of the elements of a vector 610 may be used for multiplication. Accordingly, the host processor may assign a first partial vector 611 or a second partial vector 612, not the vector 610 as a whole, to components of the PIM 630.

The host processor may assign the first block 601 to the fourth block 604 and the first partial vector 611 and the second partial vector 612 to the PIM 630. For example, the host processor may assign the first block 601 and the first partial vector 611 to a memory bank 1 632 connected to a PIM core 1 631. The host processor may assign the second block 602 and the second partial vector 612 to a memory bank 2 634 connected to a PIM core 2 633. The host processor may assign the third block 603 and the first partial vector 611 to a memory bank 3 636 connected to a PIM core 3 635. The host processor may assign the fourth block 604 and the second partial vector 612 to a memory bank 4 638 connected to a PIM core 4 637.

The PIM core 1 631 may output a first result value 621 by multiplying the first block 601 by the first vector 611. The PIM core 2 633 may output a second result value 622 by multiplying the second block 602 by the second vector 612. The PIM core 3 635 may output a third result value 623 by multiplying the third block 603 by the first vector 611. The PIM core 4 637 may output a fourth result value 624 by multiplying the fourth block 604 by the second vector 612.

In this case, unlike the example of division in the 1D row direction as described with reference to FIG. 5, an additional operation may be performed to obtain a final result value 620. The additionally performed operation may be an operation of collecting the first result value 621 and the second result value 622, collecting the third result value 623 and the fourth result value 624, and combining together a result of collecting the first result value 621 and the second result value 622 and a result of collecting the third result value 623 and the fourth result value 624.

Examples of the compressed storage format for compressing and expressing a sparse matrix and the operation method of the computing device 130 are described above according to an embodiment. Hereinafter, examples of an operating method of the electronic device 100 is described according to an embodiment.

Figure 7:
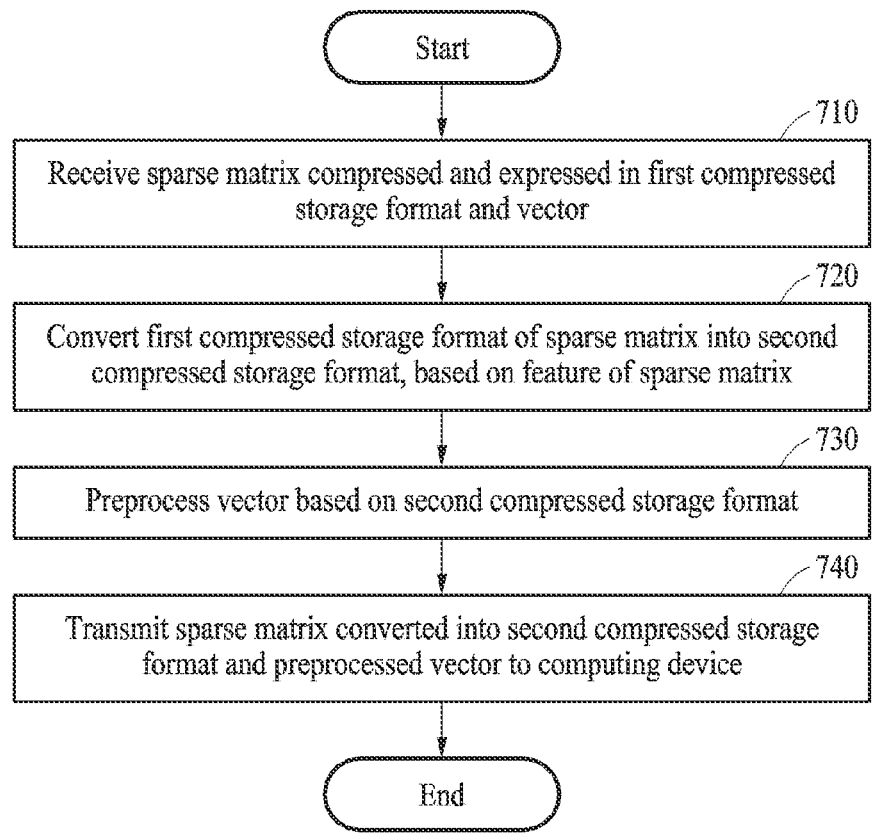
FIG. 7 illustrates an example of an operating method of an electronic device.

FIG. 7 illustrates an example of an operating method of an electronic device.

As described above, compressed storage formats for compressing and expressing a sparse matrix may vary. Therefore, one compressed storage format may not be optimized for every sparse matrix. Accordingly, a compressed storage format of a sparse matrix may be converted into one that is determined as suitable for an operation for an efficient operation.

In the following embodiments, operations may be performed sequentially, but may not be necessarily performed sequentially. For example, the order of the operations may be changed and at least two of the operations may be performed in parallel. Operations 710 to 740 may be performed by the electronic device 100. For example, the operations of the electronic device 100 may be performed by at least one component (e.g., the host processor 110 of FIG. 1).

In operation 710, a host processor may receive a sparse matrix compressed and expressed in a first compressed storage format and a vector.

The first compressed storage format may be any of the compressed storage formats described with reference to FIGS. 2 to 4, but examples are not limited thereto. The first compressed storage format may be the current compression and expression state of the sparse matrix.

In operation 720, the host processor may convert the first compressed storage format of the sparse matrix into a second compressed storage format, based on a feature of the sparse matrix.

The first compressed storage format may not express the sparse matrix well. In this case, the host processor may optimize the compressed storage format of the sparse matrix. The host processor may convert the first compressed storage format, which is the current compressed storage format of the sparse matrix, into the second compressed storage format, which is an optimized compressed storage format.

For example, even when the sparse matrix includes a number of diagonal elements, the first compressed storage format may be a CSR format, not a DIA format. In this case, the host processor may convert the first compressed storage format, which is the CSR format of the sparse matrix, into the second compressed storage format, which is the DIA format.

According to an embodiment, the host processor may optimize the sparse matrix as a whole in one compressed storage format. The host processor may convert the sparse matrix into the second compressed storage format, which is one optimized compressed storage format. For example, when the sparse matrix is an 8×8 matrix, the host processor may convert the whole 8×8 matrix into the DIA format, which is the second compressed storage format. In other words, the host processor may express the sparse matrix in one optimized compressed storage format. An example of converting the sparse matrix into the second compressed storage format, which is one optimized compressed storage format, is further described with reference to FIG. 8.

According to an embodiment, the host processor may divide the sparse matrix into a plurality of blocks. The divided plurality of blocks may also be a sparse matrix. The host processor may optimize a compressed storage format for each of the blocks. In other words, the host processor may display the second compressed storage format, e.g., an optimized compressed storage format including compressed storage formats of the blocks included by the sparse matrix. For example, when the sparse matrix is 8×8, the host processor may divide the sparse matrix into four 4×4 blocks. The host processor may convert one 4×4 block into the CSR format, two 4×4 blocks into a COO format, and one 4×4 block into the DIA format, as a non-limiting example. Accordingly, the host processor may display the 8×8 sparse matrix in the second compressed storage format including one block in the CSR format, two blocks in the COO format, and one block in the DIA format. An example of dividing the sparse matrix into the plurality of blocks is further described with reference to FIG. 10.

In operation 730, the host processor may preprocess the vector based on the second compressed storage format.

As described with reference to FIG. 6, a computing device may not need to use the whole vector for multiplication. Accordingly, the host processor may preprocess the vector based on the second compressed storage format converted for multiplication. For example, the host processor may extract and align elements of the vector to be used for multiplication, based on the second compressed storage format. An example of preprocessing the vector is further described with reference to FIG. 9.

In operation 740, the host processor may transmit the sparse matrix converted into the second compressed storage format and the preprocessed vector to the computing device.

The computing device may multiply the sparse matrix converted into the second compressed storage format by the preprocessed vector.

Hereinafter, an example of compressing and expressing a sparse matrix that is input as a whole into one compressed storage format is described.

Figure 8:
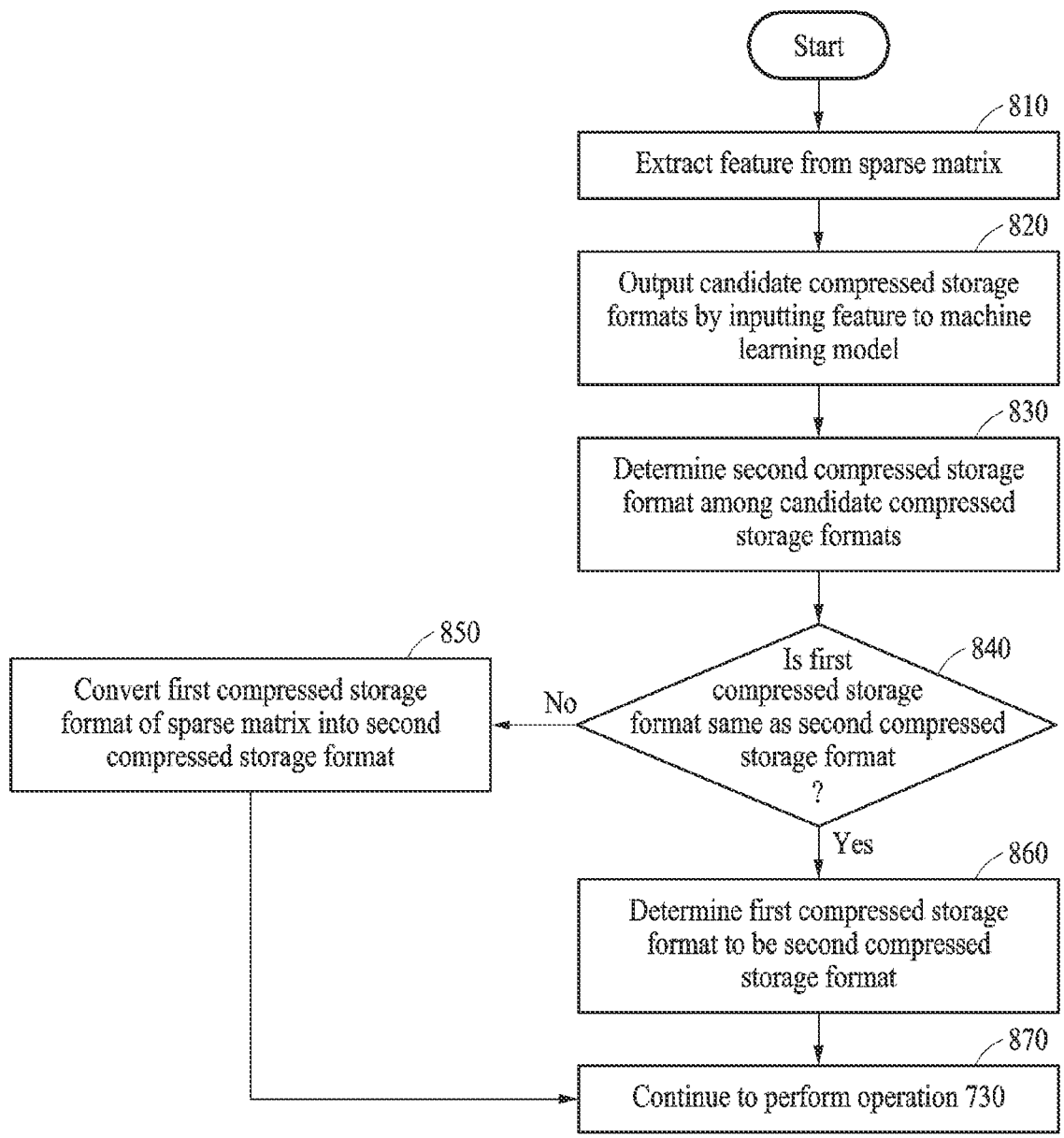
FIG. 8 illustrates an example of a method of converting a sparse matrix into a second compressed storage format.

FIG. 8 illustrates an example of a method of converting a sparse matrix into a second compressed storage format.

In the following embodiments, operations may be performed sequentially, but may not be necessarily performed sequentially. For example, the order of the operations may be changed and at least two of the operations may be performed in parallel. Operations 810 to 870 may be performed by the electronic device 100. For example, the operations of the electronic device 100 may be performed by at least one component (e.g., the host processor 110 of FIG. 1).

In operation 810, a host processor may extract a feature from a sparse matrix.

The feature of the sparse matrix may include a sparsity rate and a sparsity pattern. The sparsity rate may be a rate or percentage of zero elements of all elements of the sparse matrix. The sparsity pattern may be a pattern of the zero elements included by the sparse matrix. For example, the sparsity pattern may include whether the sparse matrix is diagonalized, the maximum pieces of non-zero data in one row, the maximum pieces of non-zero data in one column, the minimum pieces of non-zero data in one row, the minimum pieces of non-zero data in one column, M and N values in an M×N sparse matrix, the total number of non-zero elements among all elements of the sparse matrix, or whether the sparse matrix is row-major or column-major.

In operation 820, the host processor may output candidate compressed storage formats by inputting the feature to a machine learning model.

The machine learning model may be a model for outputting the most suitable compressed storage format for a sparse matrix when the feature of the sparse matrix is input thereto. As an example, the most suitable compressed storage format may be a compressed storage format that, compared to other compressed storage formats, minimizes an operation of 0 and increases a memory bandwidth. The machine learning model may be a decision tree, a multi-layer perceptron, a support vector machine, a random forest, a neural network, and/or a heuristic algorithm. In addition, when a computing device is PIM, the host processor may output candidate compressed storage formats based further on the number of cores included in the PIM.

In operation 830, the host processor may determine a second compressed storage format among the candidate compressed storage formats.

The machine learning model may output one or more candidate compressed storage formats. When there is one candidate compressed storage format, the candidate compressed storage format may be determined to be the second compressed storage format. When there is a plurality of candidate compressed storage formats, one of the candidate compressed storage formats may be determined to be the second compressed storage format.

The host processor may determine the second compressed storage format based on the number of cycles. The number of cycles may be the number of times the computing device multiplies a vector with a sparse matrix compressed and expressed in a candidate compressed storage format, e.g., to generate a final result value.

The number of cycles may be related to a val (e.g., the val 230 of FIG. 2) included in the candidate compressed storage format. The number of cycles may be the same as the number of elements included in the val.

According to an embodiment, the host processor may determine a candidate compressed storage format, in which the number of cycles is minimum, to be the second compressed storage format.

In operation 840, the host processor may determine whether a first compressed storage format is the same as the second compressed storage format.

When the first compressed storage format is different from the second compressed storage format, operation 850 may be performed. When the first compressed storage format is the same as the second compressed storage format, operation 860 may be performed.

In operation 850, the host processor may convert the first compressed storage format of the sparse matrix into the second compressed storage format. For example, when the first compressed storage format of the received sparse matrix is a CSR format, and the second compressed storage format is a DIA format, the host processor may convert the compressed storage format of the sparse matrix from the CSR format into the DIA format.

In operation 860, the host processor may determine the first compressed storage format to be the second compressed storage format. For example, when the first compressed storage format of the received sparse matrix is the CSR format, and the second compressed storage format is the CSR format, the host processor may determine the first compressed storage format to be the second compressed storage format. In other words, the host processor may not convert the first compressed storage format of the sparse matrix into the second compressed storage format.

In operation 870, the host processor may continue to perform operation 730 of FIG. 7.

Hereinafter, examples of a method of preprocessing a vector based on the second compressed storage format, is described.

Figure 9:
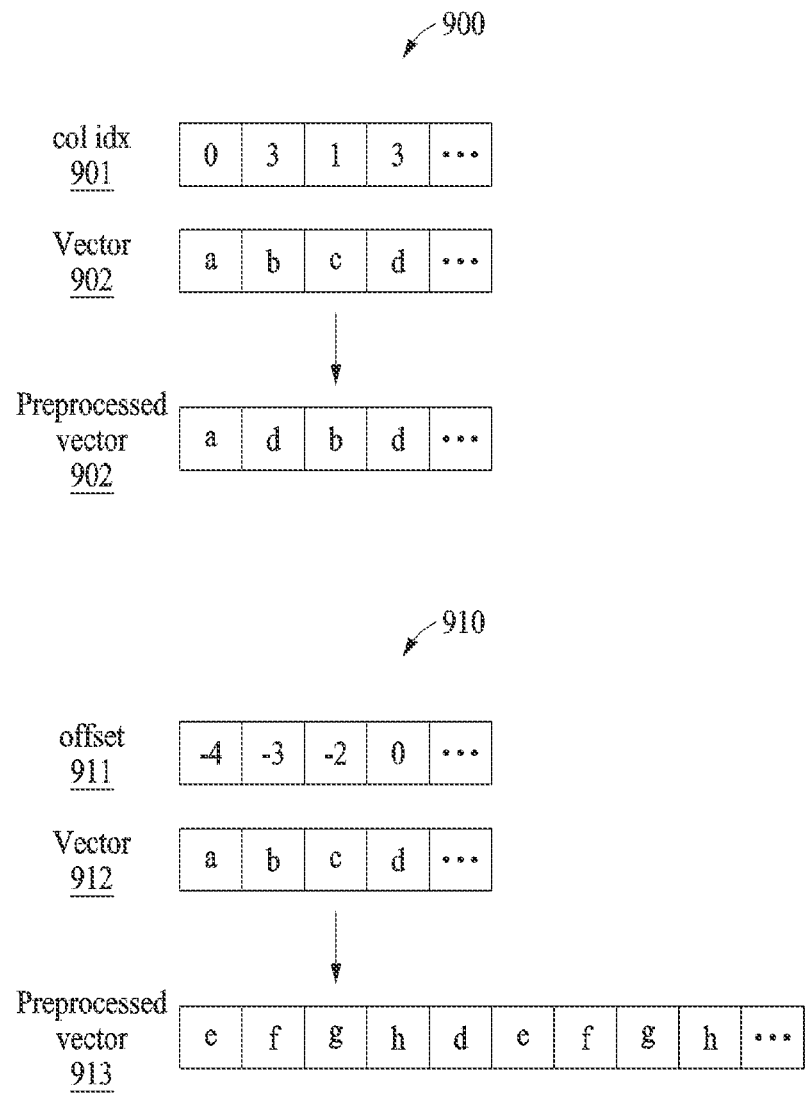
FIG. 9 illustrates an example of a preprocessing of a vector.

FIG. 9 illustrates an example of a preprocessing of a vector.

A diagram 900 illustrates a method of preprocessing a vector 902 based on a CSR format and/or a COO format. The CSR format and/or the COO format may both include a col idx 901 as described with reference to FIGS. 2 and 3. Accordingly, when the second compressed storage format is the CSR format and/or the COO format, the host processor may preprocess the vector 902 based on the col idx 901, which is a column index.

For example, the host processor may identify the col idx 901 and determine the elements of the vector 902 that are to be used for a multiplication operation. The host processor may extract and align the elements of the vector 902 that are to be used for the multiplication operation and preprocess the vector 902.

For example, the col idx 901 may include "0 3 1 3". When a column number, in which a non-zero element is, is 0 when col idx[0] is 0, an element a may be used for the multiplication operation among the elements of the vector 902, and the host processor may extract the element a. When the column number, in which a non-zero element is, is 3 when col idx[1] is 3, an element d may be used for the multiplication operation among the elements of the vector 902, and the host processor may extract the element d. When the column number, in which a non-zero element is, is 1 when col idx[2] is 1, an element b may be used for the multiplication operation among the elements of the vector 902, and the host processor may extract the element b. The host processor may align the extracted elements. Accordingly, the col idx 901 may include "a d b d".

A diagram 910 illustrates a method of preprocessing a vector 912 based on the DIA format. The DIA format may include an offset 911 as described with reference to FIG. 4. Accordingly, when the second compressed storage format is the DIA format, the host processor may preprocess the vector 912 based on the offset 911.

For example, the host processor may identify the offset 911 and determine the elements of the vector 912 that are to be used for a multiplication operation. The host processor may extract and align the elements of the vector 912 that are to be used for the multiplication operation and preprocess the vector 912.

When preprocessing the vector 912 based on the offset 911 in the DIA format, and an element of the offset 911 is a positive number, a front part of the elements of the vector 912 may be extracted. For example, when the element of the offset 911 is 2, elements a to f that are the front part of the elements of the vector 912 may be extracted. When preprocessing the vector 912 based on the offset 911 in the DIA format, and the element of the offset 911 is a negative number, the front part of the elements of the vector 912 may be omitted.

For the multiplication operation, an operation with a zero element among elements of the offset 911 in the DIA format and a whole vector may be performed, and an operation with a non-zero element of the offset 911 and an element of a vector obtained by subtracting an absolute value of the non-zero element itself from the total element number of the vector may be performed. Accordingly, the positive number of the elements of the offset 911 may require an element of the vector 912 from a front part of the vector 912 to a value obtained by subtracting an absolute value of the positive number itself from the total element number of the vector 912. In other words, when the element of the offset 911 is a positive number, the element of the vector 912 may be extracted from the front part of the vector 912 to the value obtained by subtracting an absolute value of the element from the total element number of the vector 912. The negative number of the elements of the offset 911 may require the element of the vector 912 from a rear part of the vector 912 to a value obtained by subtracting an absolute value of the negative number itself from the total element number of the vector 912. In other words, when the element of the offset 911 is a negative number, the element of the vector 912 may be extracted from the rear part of the vector 912 to the value obtained by subtracting an absolute value of the element from the total element number of the vector 912.

For example, when the element of the offset 911 is 2, the element of the vector 912 may be extracted from the front part of the vector 912 to 6 that is obtained by subtracting 2 that is the absolute value of the element itself from 8 that is the total element number of the vector 912. Accordingly, "a b c d e f" may be extracted. Further, when the element of the offset 911 is −3, the element of the vector 912 may be extracted from the rear part of the vector 912 to 5 that is obtained by subtracting 3 that is the absolute value of the element itself from 8 that is the total element number of the vector 912. Accordingly, "d e f g h" may be extracted.

When the offset 911 is "−4 −3 −2 0 . . . ", a preprocessed vector 913 may be "e f g h d e f g h . . . ".

Figure 10:
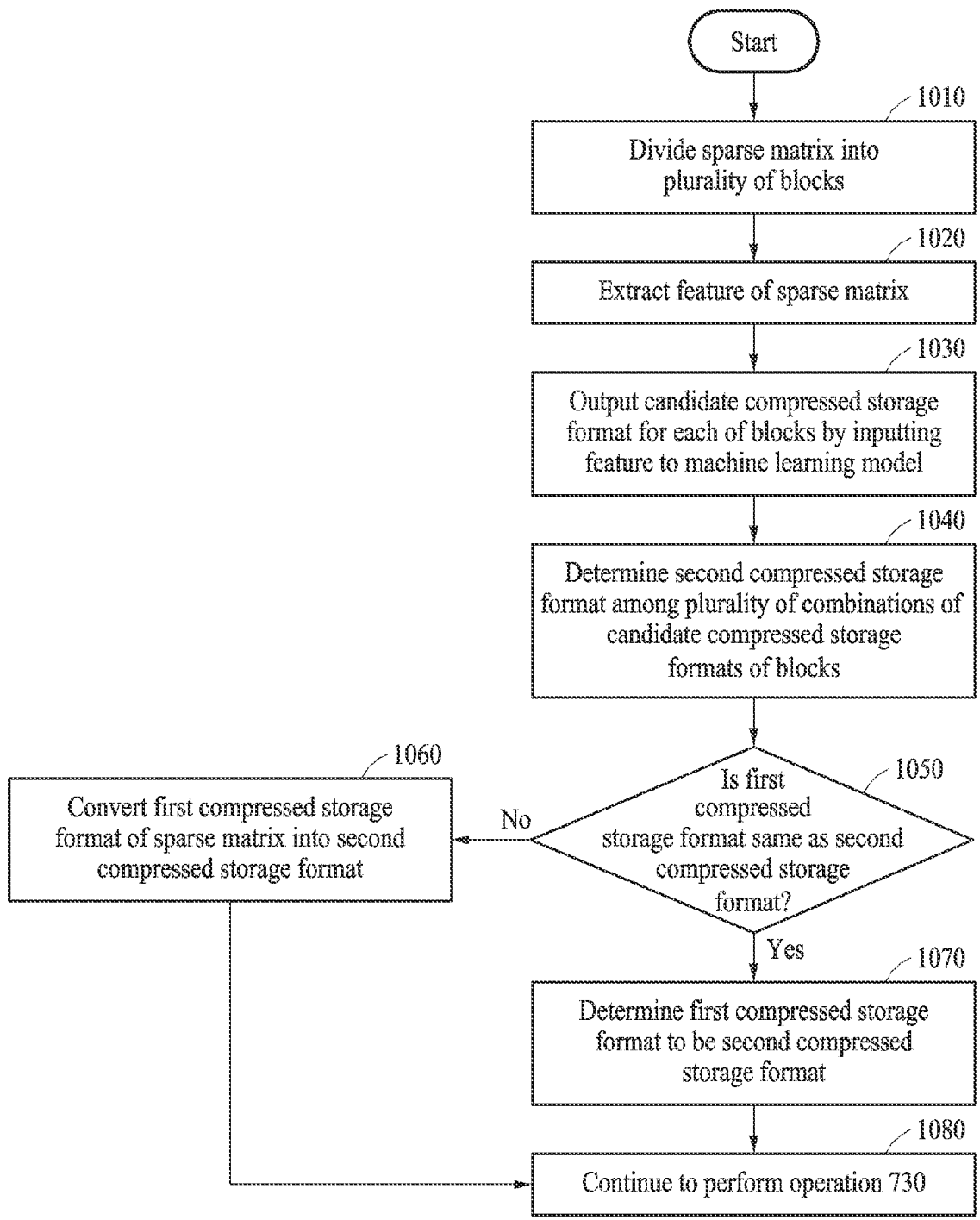
FIG. 10 illustrates an example of an operating method of an electronic device.

FIG. 10 illustrates an example of an operating method of an electronic device.

In the following embodiments, operations may be performed sequentially, but may not be necessarily performed sequentially. For example, the order of the operations may be changed and at least two of the operations may be performed in parallel. Operations 810 to 870 may be performed by the electronic device 100. For example, the operations of the electronic device 100 may be performed by at least one component (e.g., the host processor 110 of FIG. 1).

In operation 1010, a host processor may divide the sparse matrix into a plurality of blocks.

The host processor may divide a sparse matrix that is input into a plurality of blocks. The divided plurality of blocks may still be a sparse matrix. For example, the host processor may divide the input 8×8 sparse matrix into four 4×4 blocks.

In operation 1020, the host processor may extract a feature from the sparse matrix.

The feature of the sparse matrix may include a sparsity rate and a sparsity pattern. The sparsity rate may be a rate of zero elements of all elements of the sparse matrix. The sparsity pattern may be a pattern of the zero elements included by the sparse matrix. The descriptions of the sparsity rate and the sparsity pattern are omitted since the descriptions thereof are provided above with reference to FIG. 8.

In operation 1030, the host processor may output a candidate compressed storage format for each of the blocks by inputting the feature to a machine learning model.

The description of the machine learning model is omitted since the description thereof is provided above with reference to FIG. 8.

The machine learning model may output a candidate compressed storage format of each of the blocks. The machine learning model may output a candidate compressed storage format for compressing and expressing a feature of each of the blocks. There may be one or more candidate compressed storage formats.

For example, the 8×8 sparse matrix is assumed to be divided into four 4×4 blocks. In this case, when the blocks are a first block to a fourth block, the machine learning model may output a candidate compressed storage format for compressing and expressing a feature of each of the first block to the fourth block. For example, the machine learning model may output a COO format as a candidate compressed storage format for the first block. The machine learning model may output a DIA format and the COO format as respective candidate compressed storage formats for a second block and a third block. The machine learning model may output a CSR format as a candidate compressed storage format for the fourth block.

In operation 1040, the host processor may determine a second compressed storage format among a plurality of combinations of the candidate compressed storage formats of the blocks.

The host processor may generate the plurality of combinations by combining the candidate compressed storage formats output by the machine learning model. The host processor may determine the second compressed storage format among the combinations. For example, in the example described in operation 1030, the combinations may include a first combination combining the first block (the COO format), the second block (the COO format), the third block (the COO format), and the fourth block (the CSR format). The combinations may include a second combination combining the first block (the COO format), the second block (the DIA format), the third block (the DIA format), and the fourth block (the CSR format). The host processor may determine one of the first combination and the second combination to be the second compressed storage format.

The host processor may determine the second compressed storage format by using the number of cycles. The number of cycles may be the number of operations performed by a computing device when multiplying a block expressed in a candidate compressed storage format included in a combination with a vector, e.g., to generate a final result value. Accordingly, when there is a plurality of blocks included in the combination, the number of cycles may also be plural.

The host processor may determine the second compressed storage format among the combinations based on the number of cycles. The number of cycles may be related to a val of a candidate compressed storage format of a block. The number of cycles may be the same as the number of elements included in the val of the candidate compressed storage format of the block.

According to an embodiment, the host processor may determine a combination among the combinations, in which a difference between the largest number of cycles and the smallest number of cycles is the smallest, to be the second compressed storage format. When the difference between the largest number of cycles and the smallest number of cycles is the smallest, a load balance may be high because a waiting time of a component (e.g., a core) of the computing device having completed an operation first for an operation of another block to end is short. Accordingly, when prioritizing the load balance, the combination in which the difference between the largest number of cycles and the smallest number of cycles is the smallest may be determined to be the second compressed storage format.

According to an embodiment, the host processor may determine a combination having the smallest number of cycles of the largest number of cycles of each of the combinations to be the second compressed storage format. The combination having the smallest number of cycles of the largest number of cycles of each of the combinations may be a combination where an operation ends fastest. Accordingly, based on the speed of an operation, the combination having the smallest number of cycles of the largest number of cycles of each of the combinations may be determined to be the second compressed storage format. For example, when the largest number of cycles that the first combination has is 10 cycles, and the largest number of cycles that the second combination has is 6 cycles, the second combination is a combination that has the smallest number of cycles, and the second combination may be determined to be the second compressed storage format.

In other words, the method of determining the second compressed storage format among the combinations may vary depending on the purpose of a user using an electronic device.

In operation 1050, the host processor may determine whether a first compressed storage format is the same as the second compressed storage format.

When the first compressed storage format is different from the second compressed storage format, operation 1060 may be performed. When the first compressed storage format is the same as the second compressed storage format, operation 1070 may be performed.

In operation 1060, the host processor may convert the first compressed storage format of the sparse matrix into the second compressed storage format. The host processor may convert the compressed storage format of the blocks such that the sparse matrix may be compressed and expressed in the second compressed storage format.

In operation 1070, the host processor may determine the first compressed storage format to be the second compressed storage format.

In operation 1080, the host processor may continue to perform operation 730 of FIG. 7.

For example, the host processor may preprocess the vector based on the compressed storage format of the blocks included in the sparse matrix converted into the second compressed storage format. The host processor may extract and align elements of the vector that are to be used for multiplication for each of the blocks. An example of the method of preprocessing the vector is described with reference to FIG. 14.

Figure 11:
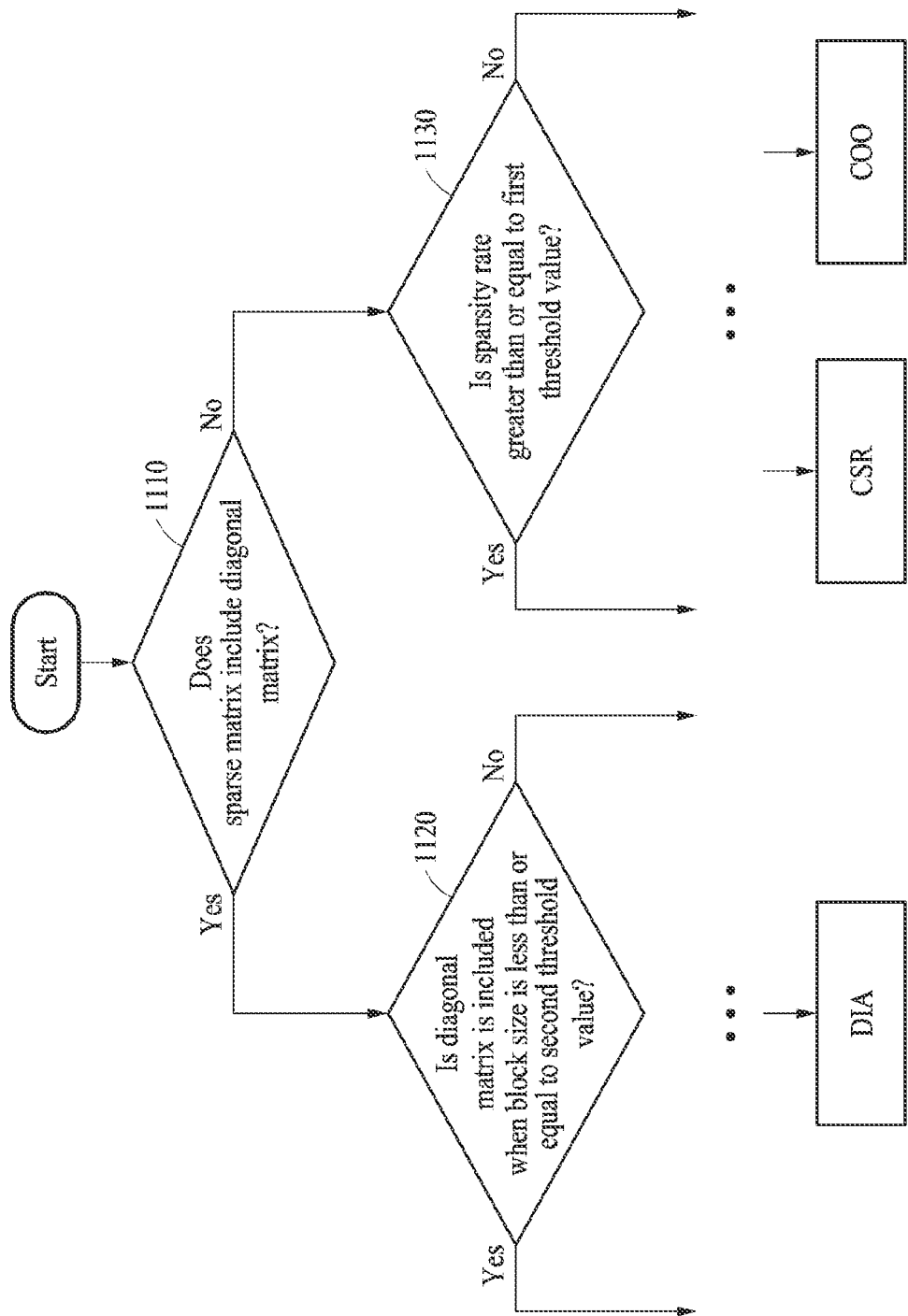
FIG. 11 illustrates an example of a machine learning model.

Hereinafter, the flowchart illustrated in FIG. 10 is further described by using an example. FIG. 11 illustrates an example of a machine learning model.

Referring to FIG. 11, a decision tree is illustrated as the example of the machine learning model for outputting candidate compressed storage formats. However, as described above, the machine learning model may be a multi-layer perceptron, a support vector machine, and/or a random forest, besides the decision tree. Therefore, the descriptions in the present disclosure are not limited to the decision tree.

In the following embodiments, operations may be performed sequentially, but may not be necessarily performed sequentially. For example, the order of the operations may be changed and at least two of the operations may be performed in parallel. Operations 1110 to 1130 may be performed by the electronic device 100. The operations of the decision tree to be described below is just an example for ease of description, operations are not limited thereto.

In operation 1110, the machine learning model may determine whether a sparse matrix includes a diagonal matrix.

The machine learning model may receive an input of a feature of the sparse matrix. The feature of the sparse matrix may include a sparsity rate and/or a sparsity pattern. When the sparse matrix includes the diagonal matrix, operation 1120 may be performed. When the sparse matrix does not include the diagonal matrix, operation 1130 may be performed.

In operation 1120, the machine learning model may determine whether the diagonal matrix is included when a block size is less than or equal to a second threshold value.

In operation 1130, the machine learning model may determine whether the sparsity rate is greater than or equal to a first threshold value.

The machine learning model may output the candidate compressed storage formats through the operations described above.

According to an embodiment, the machine learning model may output a candidate compressed storage format for compressing and expressing the sparse matrix as a whole. In other words, without dividing the sparse matrix into a plurality of blocks, the candidate compressed storage format for compressing and expressing the sparse matrix as a whole may be output. There may be one or more candidate compressed storage formats for expressing the sparse matrix as a whole. When there is one candidate compressed storage format, the candidate compressed storage format may be determined to be a second compressed storage format. When there is a plurality of candidate compressed storage formats, one of the candidate compressed storage formats may be determined to be the second compressed storage format.

According to an embodiment, when the sparse matrix is divided into the plurality of blocks, the machine learning model may output a candidate compressed storage format for each of the blocks divided from the sparse matrix. For example, when an 8×8 sparse matrix is divided into four 4×4 blocks, the machine learning model may output a candidate compressed storage format for each of the blocks. The candidate compressed storage format for each of the blocks may be plural. For example, there may be one candidate compressed storage format for a first block, but there may be two candidate compressed storage formats for a second block. In this case, candidate compressed storage formats of each of the blocks may be combined, and one of a plurality of combinations may be determined to be the second compressed storage format.

Hereinafter, examples of the candidate compressed storage formats of each of the blocks and the combinations thereof are described.

Figure 12:
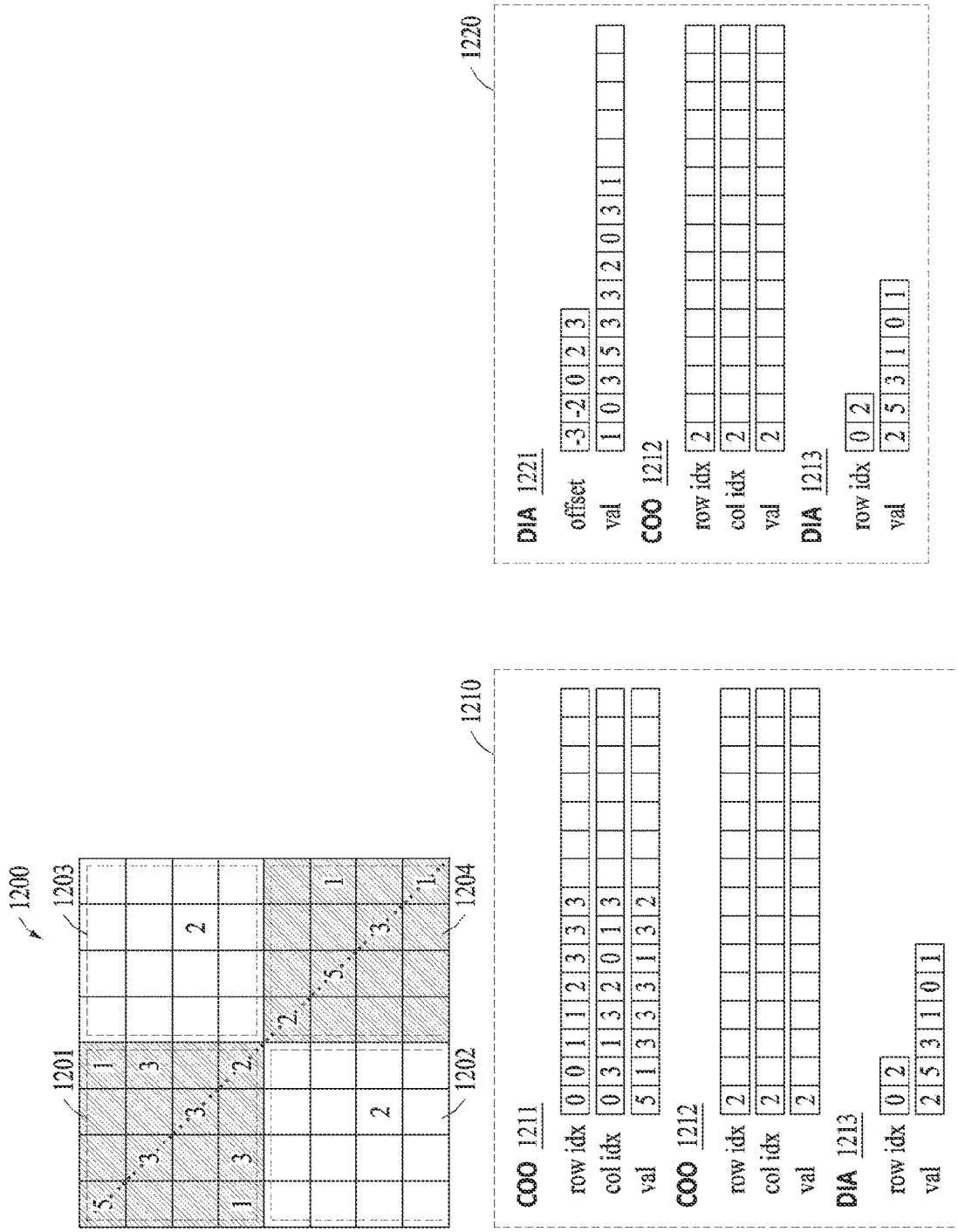
FIG. 12 illustrates an example of a combination of candidate compressed storage formats.

FIG. 12 illustrates an example of a combination of candidate compressed storage formats.

FIG. 12 illustrates a sparse matrix 1200 divided into four blocks and a plurality of combinations combining candidate compressed storage formats of each of the four blocks.

As a result of inputting a feature of the sparse matrix 1200 to a machine learning model, candidate compressed storage formats of a first block 1201 may be a COO format 1211 and a DIA format 1221. A candidate compressed storage format of a second block 1202 and a third block 1203 may be a COO format 1212. A candidate compressed storage format of a fourth block 1204 may be a DIA format 1213.

Accordingly, the combinations combining the candidate compressed storage formats of the blocks may include a first combination 1210 and a second combination 1220. The first combination 1210 may include the COO format 1211 (the first block 1201), the COO format 1212 (the second block 1202 and the third block 1203), and the DIA format 1213 (the fourth block 1204). The second combination 1220 may include the DIA format 1221 (the first block 1201), the COO format 1212 (the second block 1202 and the third block 1203), and the DIA format 1213 (the fourth block 1204).

A host processor may determine one of the first combination 1210 and the second combination 1220 to be a second compressed storage format.

The host processor may determine the second compressed storage format based on the number of cycles. The number of cycles may be the number of operations performed by a computing device when multiplying a block expressed in a compressed storage format with a vector, e.g., to generate a final result value.

The number of cycles may be related to a val of the compressed storage format. For example, when elements of the val are 6, the cycles of multiplication may also be 6.

According to an embodiment, the host processor may determine a combination, in which a difference between the largest number of cycles and the smallest number of cycles is the smallest, to be the second compressed storage format.

For example, in the first combination 1210, the number of cycles of the computing device multiplying the first block 1201 by the vector may be 8 cycles. The number of cycles of the computing device multiplying the second block 1202 or the third block 1203 by the vector may be 1 cycle. The number of cycles the computing device multiplying the fourth block 1204 by the vector may be 6 cycles. Accordingly, the difference between the largest number of cycles and the smallest number of cycles may be 7.

In the second combination 1220, the largest number of cycles may be 10 and the smallest number of cycles may be 1. The difference between the largest number of cycles and the smallest number of cycles may be 9.

Accordingly, when the first combination 1210 has a smaller difference between the largest number of cycles and the smallest number of cycles, the first combination 1210 may be determined to be the second compressed storage format.

Figure 13:
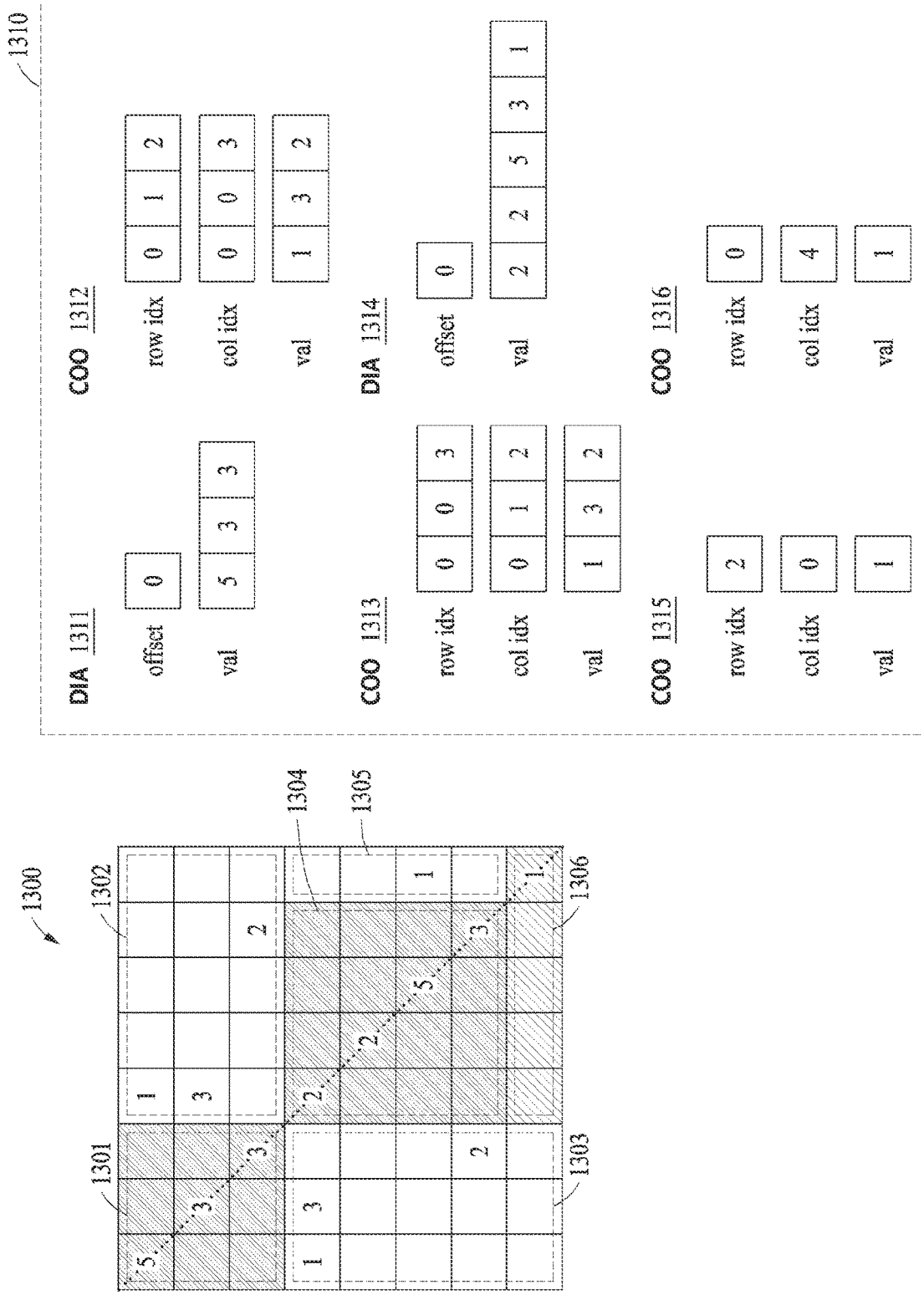
FIG. 13 illustrates an example of a second compressed storage format.

FIG. 13 illustrates an example of a second compressed storage format.

Referring to FIG. 13, a sparse matrix 1300 may be divided into six blocks. A second compressed storage format, e.g., the optimal compression and expression of the sparse matrix 1300, may be a combination of candidate compressed storage formats of the six blocks.

The sparse matrix 1300 may be divided into the blocks of different sizes, unlike FIG. 12. A first block 1301 may be a 3×3 block. A second block 1302 may be a 3×5 block. A third block 1303 may be a 5×3 block. A fourth block 1304 may be a 4×4 block. A fifth block 1305 may be a 4×1 block. A sixth block 1306 may be a 1×5 block.

A candidate compressed storage format of the first block 1301 may be a DIA format 1311. A candidate compressed storage format of the second block 1302 may be a COO format 1312. A candidate compressed storage format of the third block 1303 may be a COO format 1313. A candidate compressed storage format of the fourth block 1304 may be a DIA format 1314. A candidate compressed storage format of the fifth block 1305 may be a COO format 1315. A candidate compressed storage format of the sixth block 1306 may be a COO format 1316.

As described above, the sparse matrix 1300 may be divided into the blocks of different sizes. However, when the sizes of the blocks are not consistent, a more complicated algorithm may be required than when the blocks are divided into the same size.

Hereinafter, examples of a method of preprocessing a vector when a sparse matrix is divided into a plurality of blocks is described.

Figure 14:
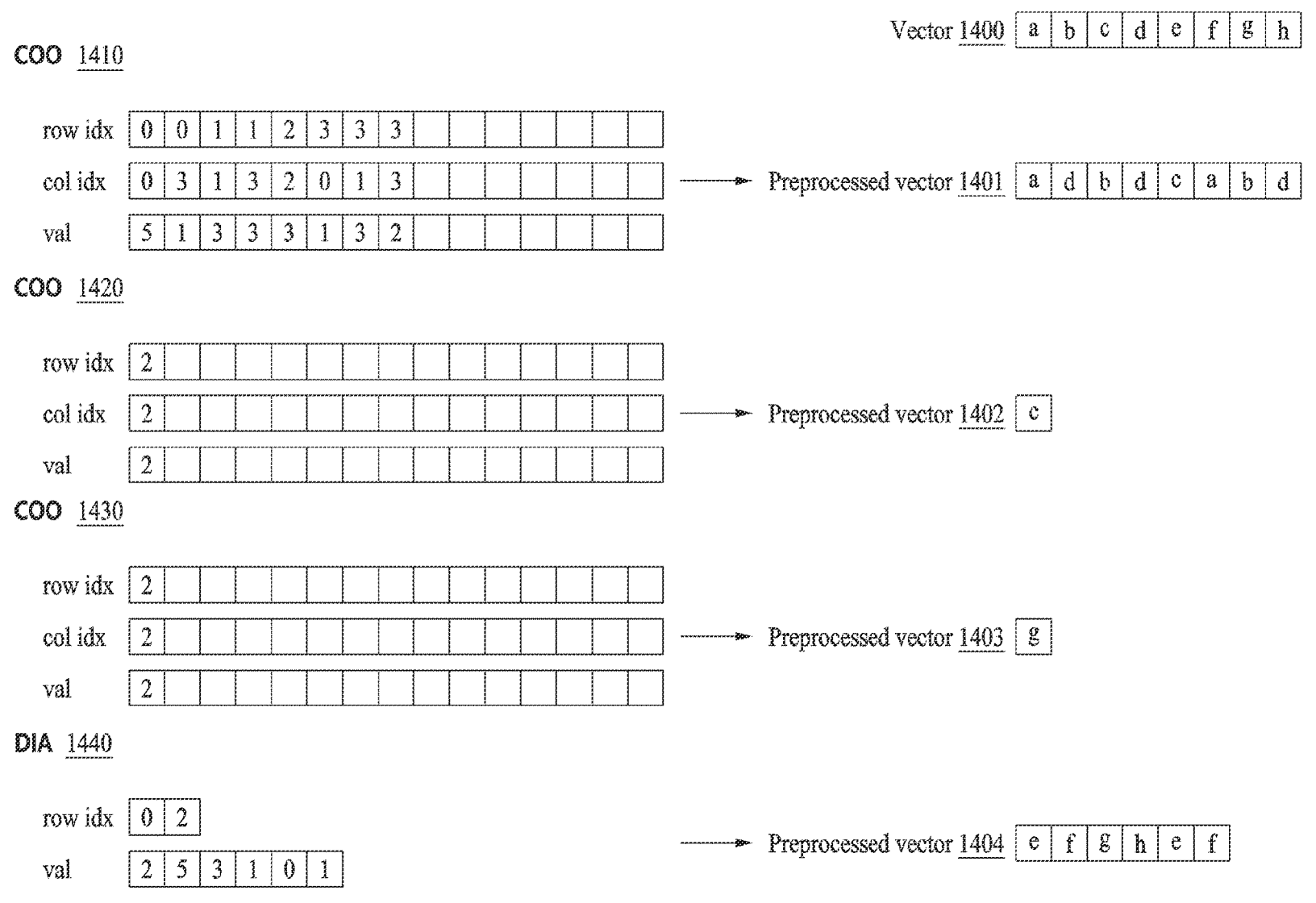

FIG. 14 illustrates an example of a preprocessing of a vector.

FIG. 14 illustrates a method of preprocessing a vector 1410 according to the first combination 1210, which is the second compressed storage format determined in FIG. 12.

When a sparse matrix is divided into a plurality of blocks, and a second compressed storage format is determined by combining compressed storage formats for each of the blocks, the vector may be preprocessed for each of the blocks. The host processor may preprocess the vector by extracting and aligning elements of the vector that are to be used for a multiplication operation for each of the blocks.

As described above with reference to FIG. 9, the vector may be preprocessed based on a col idx in COO formats 1410 and 1420. In this case, when the blocks are four 4×4 matrices divided from an 8×8 matrix, the first block 1201, which is the COO format 1410, and the second block 1202, which is the COO format 1420, may only require (e.g., be multiplied with) "a b c d" in the vector 1400 for the multiplication operation, as described above with reference to FIG. 6. In addition, the third block 1203, which is a COO format 1430, and the fourth block 1204, which is a DIA format 1440, may only require (e.g., be multiplied with) "e f g h" in the vector 1400 for the multiplication operation.

Accordingly, when the col idx of the COO format 1410 is "0 3 13 2 0 1 3", a preprocessed vector 1401 may be "a d b d c a b d". Likewise, when the col idx of the COO format 1420 is "2", a preprocessed vector 1402 may be "c".

When the col idx of the COO format 1430 is "2", a preprocessed vector 1403 may be "g". The vector may be preprocessed based on an offset in the DIA format 1440. Accordingly, when the offset is "0 2", the preprocessed vector 1403 may be "e f g h e f".

The electronic devices, host processors, memories, computing devices, PIMs, PIM cores, memory banks, electronic device 100, host processor 110, memory 120, computing device 130, PIM 530, PIM core 1 531, PIM core 2 533, PIM core 3 535, PIM core 4 537, memory bank 1 532, memory bank 2 534, memory bank 3 536, memory bank 4 538, PIM 630, PIM core 1 631, PIM core 2 633, PIM core 3 635, PIM core 4 637, memory bank 1 632, memory bank 2 634, memory bank 3 636, memory bank 4 638, and other apparatuses, devices, units, modules, and components disclosed and described herein with respect to FIGS. 1-14 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An electronic device comprising:
a host processor configured to:
convert a sparse matrix compressed and expressed in a first compressed storage format into a second compressed storage format, based on a feature of the sparse matrix, wherein the second compressed storage format is determined by inputting the feature extracted from the sparse matrix to a machine learning model;
preprocess a vector based on the second compressed storage format;
transmit the sparse matrix converted into the second compressed storage format and the preprocessed vector to a computing device; and
the computing device configured to multiply the sparse matrix converted into the second compressed storage format by the preprocessed vector.

2. The electronic device of claim 1, wherein, for the converting of the sparse matrix into the second compressed storage format, the host processor is further configured to:
extract the feature from the sparse matrix;
output candidate compressed storage formats by inputting the feature to the machine learning model; and
determine the second compressed storage format among the candidate compressed storage formats.

3. The electronic device of claim 2, wherein the feature comprises:
a sparsity rate referring to a rate of 0 values comprised by the sparse matrix; and
a sparsity pattern referring to a pattern of the 0 values comprised by the sparse matrix.

4. The electronic device of claim 2, wherein, for the converting of the sparse matrix into the second compressed storage format, the host processor is further configured to convert the first compressed storage format of the sparse matrix into the second compressed storage format in response to the second compressed storage format being different from the first compressed storage format of the sparse matrix.

5. The electronic device of claim 2, wherein, for the determining of the second compressed storage format, the host processor is further configured to determine one of the candidate compressed storage formats to be the second compressed storage format, based on a number of cycles that is a number of operations performed by the computing device in multiplying the sparse matrix converted into a candidate compressed storage format by the vector.

6. The electronic device of claim 1, wherein, for the preprocessing of the vector, the host processor is further configured to extract and align elements of the vector to be used for the multiplication based on the second compressed storage format.

7. The electronic device of claim 1, wherein, for the converting of the sparse matrix into the second compressed storage format, the host processor is further configured to:
divide the sparse matrix into a plurality of blocks; and
convert the sparse matrix compressed and expressed in the first compressed storage format into the second compressed storage format by converting a compressed storage format of the plurality of blocks.

8. The electronic device of claim 7, wherein, for the converting the sparse matrix into the second compressed storage format, the host processor is further configured to:
extract the feature of the sparse matrix;
output a candidate compressed storage format for each of the plurality of blocks by inputting the feature to the machine learning model; and determine the second compressed storage format among a plurality of combinations of the candidate compressed storage formats of the plurality of blocks.

9. The electronic device of claim 8, wherein the feature comprises a sparsity rate referring to a rate of 0 values comprised by the sparse matrix and a sparsity pattern referring to a pattern of the 0 values comprised by the sparse matrix.

10. The electronic device of claim 8, wherein the host processor is further configured to:
determine the number of cycles that is a number of operations performed by the computing device in multiplying a block in a candidate compressed storage format comprised in the plurality of combinations by the vector; and
determine one of the plurality of combinations to be the second compressed storage format based on the number of the cycles.

11. The electronic device of claim 7, wherein, for the preprocessing of the vector, the host processor is further configured to extract and align elements of the vector to be used for the multiplication for each of the plurality of blocks, based on a converted compressed storage format of the plurality of blocks comprised in the sparse matrix converted into the second compressed storage format.

12. A processor-implemented method comprising:
converting a sparse matrix compressed and expressed in a first compressed storage format into a second compressed storage format, based on a feature of the sparse matrix, wherein the second compressed storage format is determined by inputting the feature extracted from the sparse matrix to a machine learning model;
preprocessing a vector based on the second compressed storage format; and
transmitting the sparse matrix converted into the second compressed storage format and the preprocessed vector to a computing device,
wherein the computing device is configured to multiply the sparse matrix converted into the second compressed storage format by the preprocessed vector.

13. The method of claim 12, wherein the converting of the sparse matrix into the second compressed storage format comprises:
extracting the feature from the sparse matrix;
outputting candidate compressed storage formats by inputting the feature to the machine learning model; and
determining the second compressed storage format among the candidate compressed storage formats.

14. The method of claim 13, wherein the feature comprises:
a sparsity rate referring to a rate of 0 values comprised by the sparse matrix; and
a sparsity pattern referring to a pattern of the 0 values comprised by the sparse matrix.

15. The method of claim 13, wherein the converting of the sparse matrix into the second compressed storage format further comprises converting the first compressed storage format of the sparse matrix into the second compressed storage format in response to the second compressed storage format being different from the first compressed storage format of the sparse matrix.

16. The method of claim 13, wherein the determining of the second compressed storage format comprises determining one of the candidate compressed storage formats to be the second compressed storage format, based on a number of cycles that is a number of operations performed by the computing device in multiplying the sparse matrix converted into a candidate compressed storage format with the vector.

17. The method of claim 12, wherein the preprocessing the vector comprises extracting and arranging elements of the vector to be used for the multiplication based on the second compressed storage format.

18. The method of claim 12, wherein the converting of the sparse matrix into the second compressed storage format further comprises:
dividing the sparse matrix into a plurality of blocks; and
converting the sparse matrix compressed and expressed in the first compressed storage format into the second compressed storage format by converting a compressed storage format of the plurality of blocks.

19. The method of claim 18, wherein the converting the sparse matrix into the second compressed storage format further comprises:
extracting the feature of the sparse matrix;
outputting a candidate compressed storage format for each of the plurality of blocks by inputting the feature to the machine learning model; and
determining the second compressed storage format among a plurality of combinations of the candidate compressed storage formats of the plurality of blocks,
wherein the feature comprises a sparsity rate referring to a rate of 0 values comprised by the sparse matrix and a sparsity pattern referring to a pattern of the 0 values comprised by the sparse matrix.

20. The method of claim 19, wherein the determining the second compressed storage format further comprises:
determining the number of cycles that is a number of operations performed by the computing device in multiplying a block in a candidate compressed storage format comprised in the plurality of combinations by the vector; and
determining one of the plurality of combinations to be the second compressed storage format based on the number of the cycles.

* * * * *